United States Patent [19]

Nagumo

[11] 4,236,176
[45] Nov. 25, 1980

[54] LUMINANCE CIRCUIT FOR COLOR TELEVISION CAMERA

[75] Inventor: Fumio Nagumo, Yokohama, Japan

[73] Assignee: Sony Corporation, Tokyo, Japan

[21] Appl. No.: 60,193

[22] Filed: Jul. 24, 1979

[30] Foreign Application Priority Data

Jul. 28, 1978 [JP] Japan ................... 53/92173

[51] Int. Cl.³ .............................. H04N 9/07
[52] U.S. Cl. .................................... 358/43
[58] Field of Search ............ 358/43, 44, 48, 50, 358/52

[56] References Cited

U.S. PATENT DOCUMENTS

4,149,182   4/1979   Yamanaka et al. .............. 358/43

Primary Examiner—John C. Martin
Attorney, Agent, or Firm—Hill, Van Santen, Steadman, Chiara & Simpson

[57] ABSTRACT

A two-chip type CCD color camera is proposed, wherein a green filter and a line-sequentially arranged blue-red filter are used in association with separate CCD imagers and in which the luminance signal is synthesized from the output signals of both CCD imagers, and wherein the signal response of the green imager is caused to coincide with the signal response of the red-blue imager by using a comb-filter circuit in the transmission path of the output signal from the green imager for synthesizing the luminance signal.

13 Claims, 7 Drawing Figures

LUMINANCE CIRCUIT FOR COLOR TELEVISION CAMERA

BACKGROUND OF THE INVENTION

1. Field of the Invention

This invention relates generally to a solid state color television camera, and more particularly to a luminance circuit in a camera which employs a pair of solid state imaging devices.

2. Description of the Prior Art

Figures 1, 2:
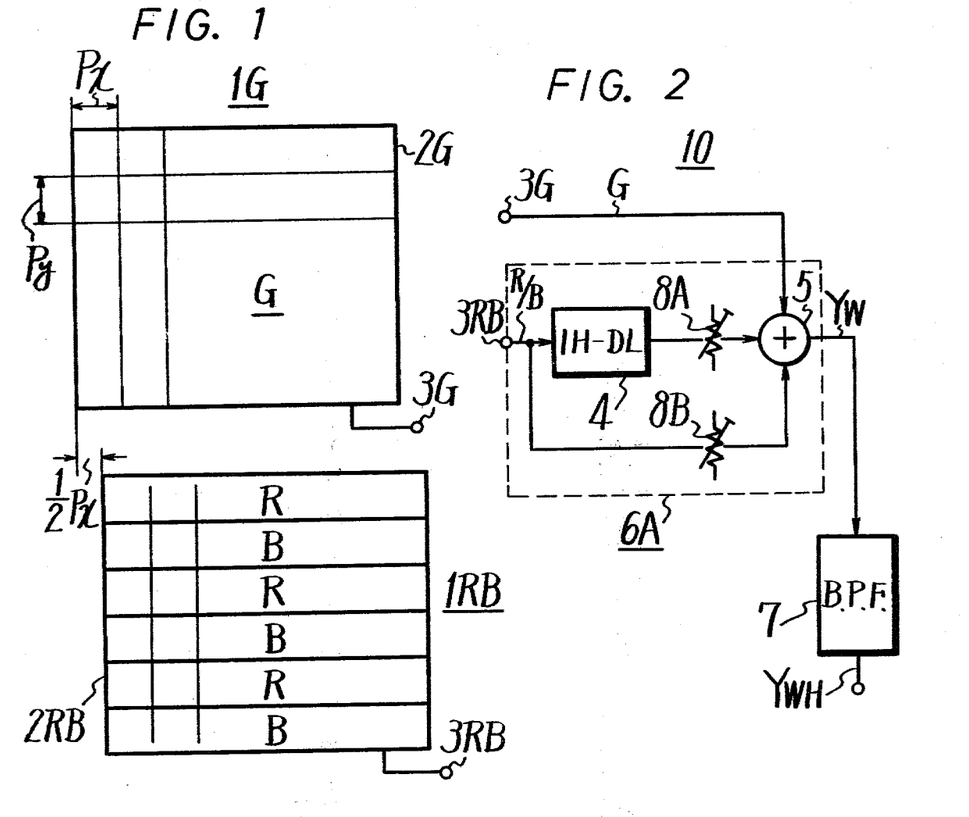
FIG. 1 is a view showing the relationship between image pick-up devices and color filters of a solid state color television camera to which the present invention is applied.
FIG. 2 is a circuit diagram showing an example of the prior art luminance signal synthesizing circuit.

In the prior art, a television camera has been proposed which employs a semiconductor element, for example, a CCD (charge-coupled device) as an image pick-up device. It also has been known to provide a solid state color camera in which two CCD chips are used as image pick-up devices, with one CCD chip being used to develope a first color signal such as a green color signal, and the other CCD chip being used to develop second and third color signals such as red and blue color signals, line-by-line. For such structures, as shown in FIG. 1, a green color filter 2G is mounted in front of one image pick-up device 1G, and a laterally striped color filter 2RB is mounted in front of the other image pick-up device 1RB so as to produce red and blue color signals in a line-sequence manner.

With an interlace scanning system, the arrangement or alignment pitches Pg of the picture elements and the color striped filter 2RB are selected so that two picture elements are included in one pitch of the filter 2RB in the vertical direction.

An image of an object may be projected on one image pick-up device 1RB, so as to be shifted by $\frac{1}{2}$ Px (where Px represents the alignment pitch of picture elements in the horizontal direction) in the lateral direction from an object image, which may be projected on the other image pick-up device 1G. In FIG. 1, the image pick-up device 1RB is shifted by $\frac{1}{2}$ Px from the image pick-up device 1G so as to illustrate the above conditions.

The above described image pick-up system is advantageous for synthesizing a luminance signal. Since the sampling by the image pick-up or imaging device are opposite in phase, the carrier and associated side band components, which will cause distortion when synthesizing the luminance signal, can be cancelled.

FIG. 2 illustrates a prior art circuit 10 which is used to synthesize a luminance signal, especially a luminance signal $Y_{WH}$ of a high frequency band. In the luminance signal forming or synthesizing circuit 10 of FIG. 2, a terminal 3G is supplied with a green signal G provided by the image pick-up device 1G and a terminal 3RB is supplied with line-sequence red and blue signals R and B provided by the image pick-up device 1RB, respectively. In order to place the red and blue signals R and B in synchronism, a delay line circuit 4 of one horizontal scanning period (1H) is provided as shown. The delayed red and blue signals and the non-delayed red and blue signals and the green signal are applied to an adder 5 to produce a luminance signal $Y_W$ having a wide frequency band. This luminance signal $Y_W$ is fed to a band pass filter 7 where it is limited to a frequency band. In this example, a luminance signal $Y_{WH}$ of high frequency band such as 0.7 to 4.5 MHz is obtained from the band pass filter 7. The low frequency band signal of the luminance signal $Y_W$ is provided by a separate circuit so as to satisfy the relationship of the luminance signal as specified in the NTSC system. In this example, the adder 5 and delay line circuit 4 of 1H form a comb filter 6A.

Let it be assumed that a blue signal $B_{n+1}$ is obtained from the $(n+1)'$ line. When the red and blue signals R and B are attenuated by $\frac{1}{2}$ by passing through variable resistors 8A and 8B respectively, a luminance signal $Y_{Wn+1}$ on the $(n+1)'$ line can be expressed as follows:

$$Y_{Wn+1} = \frac{1}{2}(G_{n+1} + \frac{R_n + B_{n+1}}{2}) \tag{1}$$

Since the image pick-up devices 1G and 1RB are spatially shifted by $\frac{1}{2}$ Px with respect to the projected image, the sampling carrier of the green signal G will be opposite in phase to that of the red and blue signals R and B. Therefore, if an object to be picked up has the input level of $G = \frac{1}{2}(R+B)$ such as a black and white image, the side band components of the green signal G and the red and blue signals R and B will cancel each other, and hence no side band components remain in the base band (especially in the high band components) of the luminance signal YW. This allows the aliasing or folded distortion can be removed.

Further, even if an object to be picked up is not black and white, the noise on a reproduced picture caused by the aliasing error can be substantially suppressed.

Figure 3A:
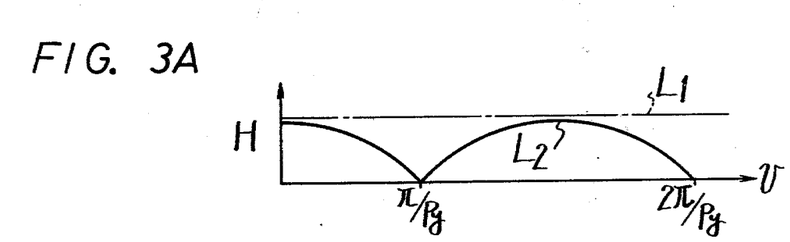
FIGS. 3A and 3B are graphs showing the transfer characteristics of a pick-up system in the vertical direction which are used to explain the difference between the prior art and the invention.

In case of utilizing the circuit 10 shown in FIG. 2, the side band component is somewhat cancelled with an object includes a pattern which will change in the vertical direction, but none of the side band components are cancelled when the object includes a pattern which changes in a slant direction and hence an aliasing distortion will be generated. This is caused by the difference between the transfer characteristic for the green signal G (refer to a curve L1 in the graph of FIG. 3A) and the transfer characteristics for the red and blue signals R and B (refer to a curve L2 in the graph of FIG. 3A).

SUMMARY OF THE INVENTION

Accordingly, an object of the present invention is to provide a signal processing circuit for use with a novel color television camera.

Another object of the invention is to provide a novel luminance signal deriving system suitable for use with a 2-chip (such as CCD chip) type solid state color television camera.

This invention is applied to a color camera system using two chips in which one chip has a green color filter and the other chip has a laterally striped color filter of blue and red.

In a color camera system to which the invention is applied, the two chips are shifted in position by one half of the alignment pitch of the picture elements with respect to an image object.

A feature of the invention comprises a circuit which synthesizes a luminance signal based upon the outputs from two chips.

According to the present invention, the side band components which are caused by sampling an object image with picture elements are cancelled and hence the base band components of a relatively high frequency band can be utilized as the luminance signal.

With this invention, the transfer characteristics for respective color signals, from which a luminance signal is synthesized, are made coincident with each other so as to cancel the side band components even in an object image which varies in the vertical direction.

In the invention, a comb-filter is used to make the transfer characteristics for the green color signal coincident with the transfer characteristics of the red and blue line sequential color signals.

The signal synthesized under the above described cancelling conditions is different from the luminance signal required, for example, in the NTSC system. The low frequency band component of a luminance signal provided in this invention is a signal having the mixing ration required in the NTSC system.

Other objects, features and advantages of this invention will be apparent from the following description taken in conjunction with the accompanying drawings through which the like reference numerals and letters designate the same elements.

DESCRIPTION OF THE PREFERRED EMBODIMENTS

This invention will be hereinafter described in detail with reference to the drawings.

Figure 4:
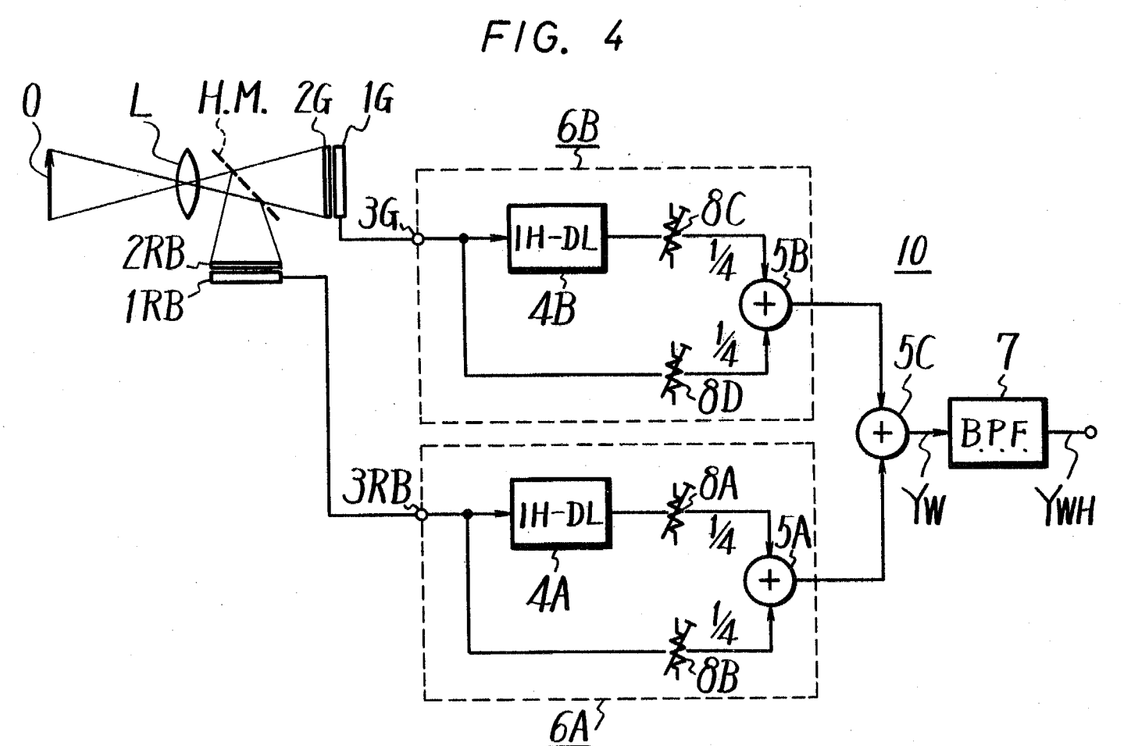
FIG. 4 is a circuit diagram showing an example of the luminance signal synthesizing circuit according to the invention.

This invention relates to a luminance signal synthesizing system, and an example of this system is shown in FIG. 4. As described above, and also shown in FIG. 4, a color television camera system according to the invention comprises two CCD image pick-up or imaging devices 1G and 1RB which have color filters 2G and 2RB, respectively. That is, the green color imaging device 1G has the green color filter 2G and the red-blue color imaging device 1RB has the red-blue color filter 2RB which consists of red and blue color filter stripes arranged alternately in the vertical direction (refer to FIG. 1).

An image O of an object is focused on the respective imaging devices 1G and 1RB by a lens L through a half-mirror HM. In this case, the focused object images on the imaging devices 1G and 1RB are displaced in horizontal position by ½ Px where Px is the alignment pitch of picture elements of the imaging devices in the horizontal direction.

In the example of the invention shown in FIG. 4, wherein only the luminance signal synthesizing circuit 10 is shown, there is provided a comb-filter 6B so as to assure that the green color signals G have the same transfer characteristic as the red and blue color signals R and B. When the comb-filter 6A utilizes the color signals from two adjacent lines to synthesize a luminance signal, the other comb-filter 6B also utilizes the color signals from two adjacent lines. The comb-filter 6B comprises a delay line circuit 4B having a delay of 1H and an adder 5B. The comb-filter of 6B also includes a delay line circuit 4A with a delay of 1H and the variable resistors 8C and 8D for adjusting the levels of the color signals. The outputs from the adders 5A and 5B of the comb-filters 6A and 6B are applied to an adder 5C.

The luminance signal $Y_W$ from the adder 5C of the circuit 10 can be expressed as follows:

$$Y_{Wn+1} = \tfrac{1}{4} \{(Gn + Gn + 1) + (Rn + Bn + 1)\} \quad (2)$$

The balance condition when the transfer characteristics are coincident with each other will be explained and compared to the prior art.

An object image having a slant stripe pattern will be taken into account. Input signals R(u, v), G(u, v) and B(u, v) (wherein u and v are angular frequencies of the object image in the horizontal and vertical directions) are as follows:

$$\left. \begin{array}{l} R(u, v) = r \cos(ux + vy) \\ G(u, v) = g \cos(ux + vy) \\ B(u, v) = b \cos(ux + vy) \end{array} \right\} \quad (3)$$

where r, g and b are input levels, respectively. These input signals R(u, v) to B(u, v) are sampled and then delivered from the image pick-up devices 1G and 1RB, respectively.

If the frequency transfer function is as Hy, the luminance signal $Y_W$ of the prior art can be expressed as follows:

$$Y_W = \tfrac{1}{2} \left( G + \frac{Hy}{2}(R + B) \right) \quad (4)$$

Thus, if the above described sampled outputs are substituted to the equation (4), respectively, the following equation (5) is obtained, in which it is recognized that only the side band components of the first order are shown.

$$Y_W = \tfrac{1}{2} [\{g + \tfrac{Hy}{4}(r + b)\} \cos(us + vy) \quad (5)$$
$$+ \{-g + \tfrac{Hy}{4}(r + b)\} \cos\{(\tfrac{2\pi}{Px} + u)x + vy\}$$
$$+ \{-g + \tfrac{Hy}{4}(r + b)\} \cos\{(\tfrac{2\pi}{Px} - u)x + vy\}]$$

In case of an image of an object with a vertical stripe pattern, since v=0 and Hy=2, where Hy is given by Hy=1+exp(−j v Py), the side band components Ss can be expressed as follows:

$$Ss = -g + \tfrac{1}{4}Hy(r + b) = \tfrac{1}{2}(r + b) - g \quad (6)$$

Thus, balance is established because $g = \tfrac{1}{2}(r+b)$ and hence the side band components will be cancelled.

However, in case of an image of an object having a pattern other than the vertical stripe pattern, since v≠0, even though $g = \tfrac{1}{2}(r+b)$, the side band components Ss remain and can be expressed as follows:

$$Ss = \tfrac{1}{2}Hy - 1 = \tfrac{1}{2}\{\exp(-j v Py) - 1\} \neq 0 \quad (7)$$

Thus, the side band components are not cancelled and aliasing distortion will occur.

In the present invention the luminance signal $Y_W$ is expressed by the following expression (8) obtained from equation (2).

$$Y_W = \tfrac{1}{4}Hy\{G + (R + B)\} \quad (8)$$

Thus, the side band component Ss is given by the following expression (9).

$$S_s = \tfrac{1}{4}Hy\{-g + (r + b)\} \quad (9)$$

Therefore, if the level relation of $g=\tfrac{1}{2}(r+b)$ is satisfied, balance is established even under conditions where $v \neq 0$ and hence the side band components will be cancelled.

Figure 3B:
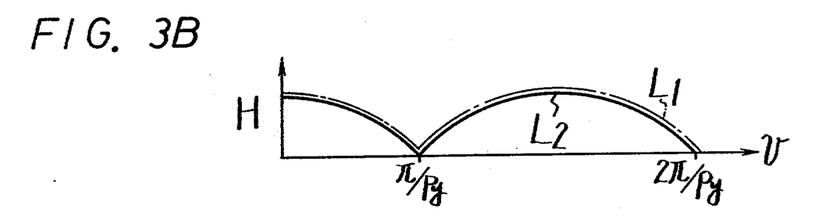

According to the invention, the transfer characteristics of the green signal in the vertical direction which is used to synthesize the luminance signal become such as shown by curve L2 which is substantially the same as shown by curve L1 (one-dot chain line) in the graph of FIG. 3B.

Figure 5:
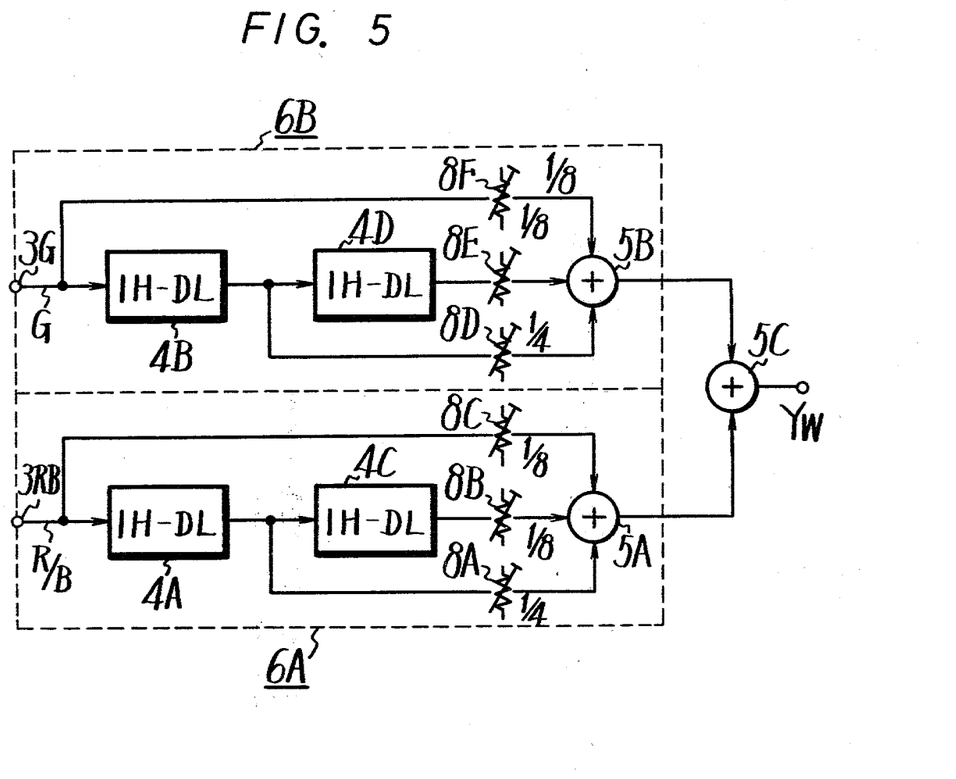
FIG. 5 is a circuit diagram showing another example of the invention.

FIG. 5 is a circuit diagram showing another example of the invention in which the outputs of three lines are utilized to produce the luminance signal $Y_W$. In this case, the luminance signal $Y_W$ is synthesized with signal levels having the relationships among the color signals as indicated in the Figure by the fractions shown thereon.

In FIG. 5, 4A through 4D designate 1H delay line circuits and 8A through 8F designate variable resistors for adjusting signal levels, respectively and these are connected as shown with the adders 5B and 5A as shown.

In the example of FIG. 5, the comb-filters 6B and 6A produce the outputs, respectively, expressed as follow:

$$\frac{Gn}{8} + \frac{Gn-1}{4} + \frac{Gn-2}{8}$$
$$\frac{Rn}{8} + \frac{Bn-1}{4} + \frac{Rn-2}{8}$$

Thus, the luminance signal $Y_W$ derived from the adder 5C is expressed as follows:

$$Y_W = \frac{Rn + Gn + Rn-2 + Gn-2}{8} + \frac{Gn-1 + Bn-1}{4}$$

Figure 6:
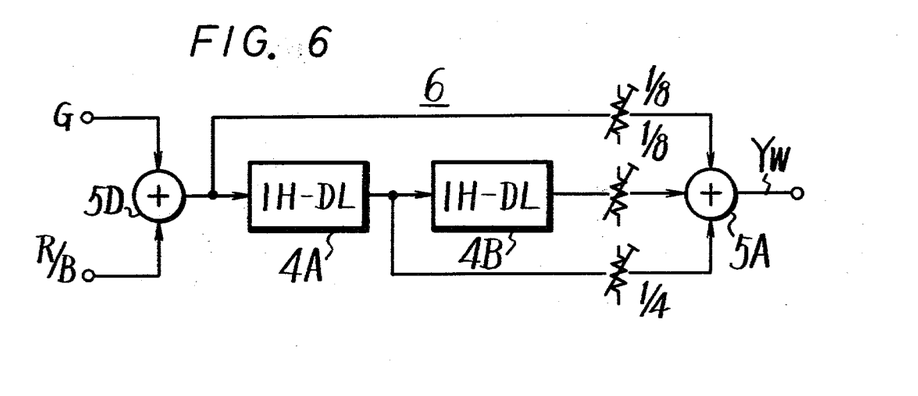
FIG. 6 is a circuit diagram showing a modified form of the example shown in FIG. 5.

The circuit shown in FIG. 5 can be simplified as shown in FIG. 6. In FIG. 6, 4A and 4B designate 1H delay line circuits, respectively, and the circuit shown in FIG. 6 will operate similar to that shown in FIG. 5. In FIG. 6, 5D designates an adder which adds the color signals G, R and B and applies the added signal to the delay line circuit 4A and to the adder 5A through the variable resistors having the impedance shown.

Next, an example of the solid state color camera to which this invention is applied will be described with reference to FIG. 7.

Figure 7:
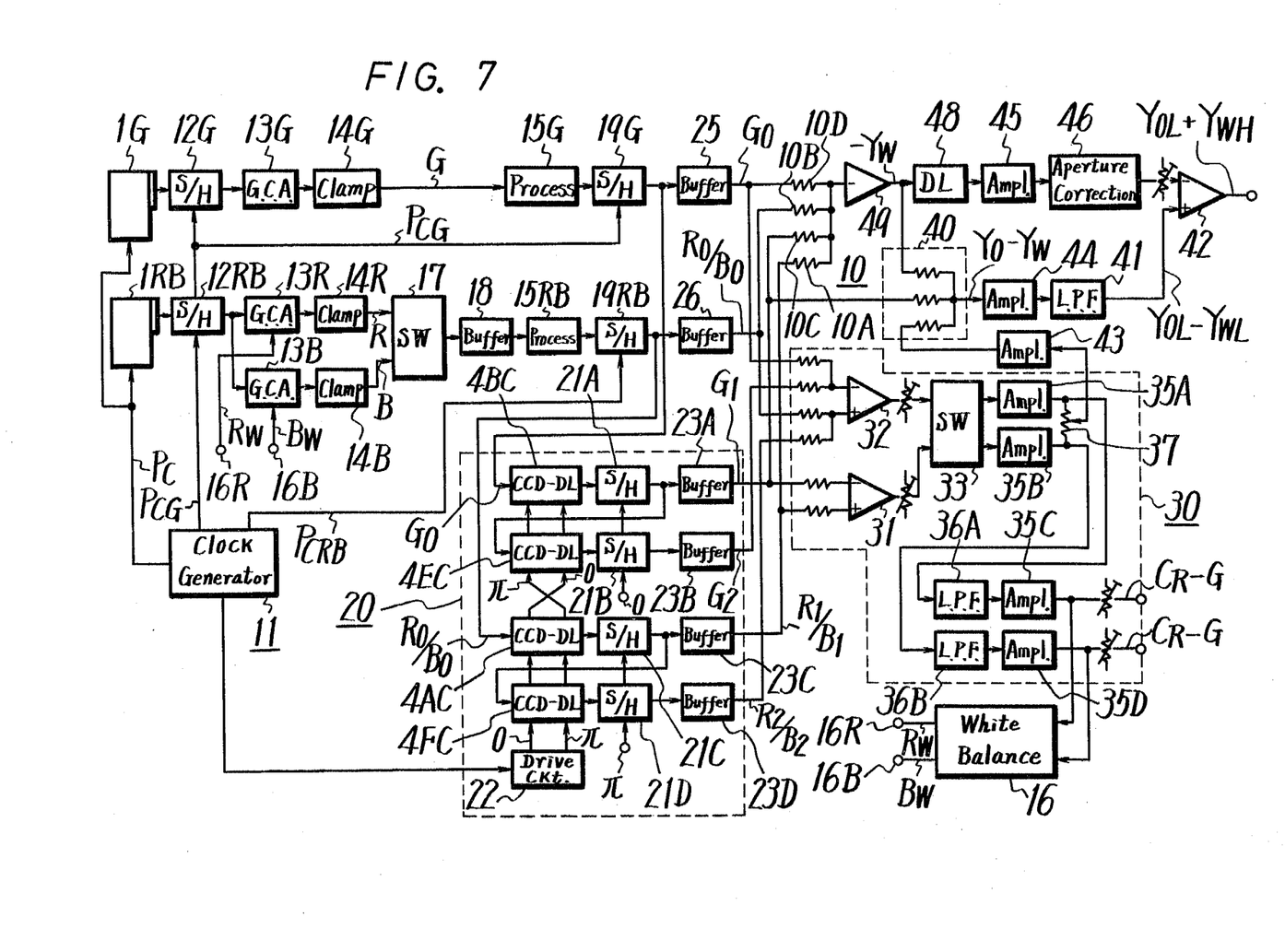
FIG. 7 is a block diagram showing a two-chip type CCD color television camera in which the invention is employed.

In the example of FIG. 7, the image pick-up devices 1G and 1RB are supplied with a clock pulse Pc which is produced by a clock generator 11. In this case, the image pick-up method is such that the image pick-up method is such that the image pick-up devices are shifted by ½ picture element, and the shift of the image pick-up devices in space and also in time must be employed. In the example of FIG. 7, the respective image pick-up devices comprising CCD chips are driven at the same phase, but with a predetermined time difference ($\pi$-phase) is used at the signal processing system of the rear stage, where the $\pi$-phase means that there is a phase shift of ½ sampling period from the sampling pulse and the 0-phase means that the phases are coincident. The green signal G derived from the image pick-up device 1G is shaped by a sampling hold circuit 12G and then applied through a gain control amplifier 13G and a clamp circuit 14G to a process circuit 15G which provides process treatment such as $\gamma$-correction.

The red and blue signals R and B derived from the other image pick-up device 1RB are similarly processed. In this case, the gain control amplifiers provided in the signal system are for adjusting the white balance, so that they are adjusted independently. Therefore, two amplifiers 13R and 13B are provided at the output of a sampling hold circuit 12RB which receives the output from the image pick-up device 1RB. Gain control signals $R_W$ and $B_W$ which are produced by a white balance control circuit 16 are applied to the amplifiers 13R and 13B, respectively. The control signals $R_W$ and $B_W$ are provided from difference signals $C_{R-G}$ and $C_{B-G}$ between the color signals R and G and between the color signals B and G as described later.

The line-sequential signals of red and blue signals R and B, which have their white balance adjusted, are fed through clamp circuits 14R and 14B to a switch circuit 17 to be converted therein to a line-sequential signal which consists of only red and blue signals R and B which are adjusted in white balance. The line-sequential signal from the switch circuit 17 is applied through a buffer amplifier 18 to a process circuit 15RB common to the red and blue signals R and B.

The respective color signals G, R and B, which are processed, are fed to sampling hold circuits 19G and 19RB for time axis adjustment, respectively. That is, the time difference, which is necessary for the image pick-up method with the shift of ½ picture element, is obtained during signal processing. To this end, sampling pulses $P_{CG}$ and $P_{CRB}$ are applied to the sampling hold circuits 19G and 19RB from the sampling hold circuit 12RB and clock generator 11. These pulses have a phase difference of $\pi$ between them which corresponds to one-half of the sampling period. Further, the sampling hold circuits 19G and 19RB absorb the time variations of the respective signal systems, and produce output signals having a phase difference of $\pi$ and this is accomplished by adjusting the phase of the pulse $P_{CRB}$.

As described above, according to the present invention, the high frequency band component $Y_{WH}$ of the luminance signal is produced by utilizing the signal before 1H i.e. signals of two adjacent lines, while the color signals are produced by utilizing the signals from three lines. A delay circuit 20 is provided and in this example, a delay element comprising a CCD is used to obtain a delay time of 1H. Delay elements 4BC and 4EC are connected in cascade, and sampling hold circuits 21A and 21B for wave-shaping are connected to the output terminals of the respective delay elements 4BC and 4EC, respectively. From one sampling hold circuit 21A there is obtained the green signal delayed by 1H (which is taken as G1), while from the other sampling hold circuit 21B there is obtained the green signal delayed by 2H (which is taken as G2).

For the other signal system, there is provided a similar circuit. That is, a pair of delay elements 4AC and 4FC are connected in cascade, and sampling hold circuits 21C and 21D for wave-shaping are connected to the output terminals of the delay elements 4AC and 4FC, respectively. Thus, from one sampling hold circuit 21C there is obtained the line-sequential signal (which is taken as R1/B1 delayed by 1H, while from the other sampling hold circuit 21D there is obtained the line-sequential signal (which is taken as R2/B2) delayed by 2H, respectively.

A clock pulse for driving the respective delay elements 4AC, 4BC, 4EC and 4FC is generated from a drive circuit 22 which is of 2-phase clock in this example and which is driven by the clock from the clock generator 11. Since there must be maintained a phase difference of $\pi$ between the color signal G and the red and blue signals R and B, this phase difference is obtained when the delay elements 4AC, 4BC, 4EC and 4FC and the sampling hold circuits 21A to 21D are driven. The sampling hold circuits 21A to 21D have, in addition to wave-shaping functions, additional functions to maintain the synchronization of the sample-timing for the sampling hold circuits 19G and 19RB and to assure that the frequency characteristics coincide. In FIG. 7, 23A to 23D designate buffer amplifiers connected to the output terminals of the sampling hold circuits 21A to 21D, and 25 and 26 designate buffer amplifiers connected to the output terminals of the sampling hold circuits 19G and 19RB, respectively.

In order to produce difference signals $C_{R-G}$ and $C_{B-G}$ from the respective color signals G0, G1, G2, R0/B0, R1/B1 and R2/B2, these are fed to a color signal forming circuit 30. The color signals G1 and R1/B1, which are delayed by 1H, are fed to the corresponding input terminals of an operational amplifier 31 for matrixing. Thus, this operational amplifier 31 produces the following difference signals on the 2n'th line and the (2n+1)'th line.

$$(B_{2n-1} - G_{2n-1}) \tag{10}$$

$$(R_{2n} - G_{2n}) \tag{11}$$

Similarly, the color signals G2 and R2/B2, which are delayed by 2H, and the color signals G0 and R0/B0, which are not delayed, are fed to the corresponding input terminals of an operational amplifier 32 for matrixing. Thus, this operational amplifier 32 produces the following difference signals on the 2n'th line and the (2n+1)'th line.

$$\frac{R_{2n} + R_{2n-2}}{2} - \frac{R_{2n} + G_{2n-2}}{2} \tag{12}$$

$$\frac{B_{2n+1} + B_{2n-1}}{2} - \frac{G_{2n+1} + G_{2n-1}}{2} \tag{13}$$

The output signals from the operational amplifiers 31 and 32 are fed to a switch circuit 33 which then produces the difference signal of the red signal R or $C_{R-G}$ at one output terminal (from the expressions (11) and (12)) and the difference signal of the blue signal B or $C_{B-G}$ (from the expressions (10) and (13)) at the other output terminal.

The difference signals $C_{R-G}$ and $C_{B-G}$ are suitably processed by amplifiers 35A to 35D and low pass filters 36A and 36B and then modulated so as to become carrier color signals.

Since the luminance signal synthesizing circuit 10 is described in connection with FIG. 4, its detailed description will not be repeated. However, the delay circuits 4A and 4B of FIG. 4 correspond to the delay elements 4AC and 4BC and are made of CCD chips in the delay circuit 20 of FIG. 7, respectively. Also, the adder is formed of the resistors 10A to 10D in FIG. 7. The respective color signals are added and fed to an inverting amplifier 49 which produces a phase-inverted luminance signal $-Y_W$. This signal $-Y_W$ includes frequency components from low and high frequency bands and is a luminance signal in which the side band components are cancelled.

However, since the low frequency band component in the finally obtained luminance signal is a signal component which satisfies the relationship of the NTSC system as described above, the low frequency band component of the signal $-Y_W$ will be later removed.

A low frequency band luminance signal $Y_{OL}$ used in the example of FIG. 7 is provided by the following manner. That is, the levels of the difference signals $C_{R-G}$ and $C_{B-G}$ are suitably adjusted by a variable resistor 37 and then fed through an amplifier 43 to a mixing circuit 40 to which the green signal G1 delayed by 1H is applied. The mixed output signal from the mixing circuit 40 is applied through an amplifier 44 to a low pass filter 41. From this low pass filter 41 there is obtained the low frequency band signal $Y_{OL}$ which satisfies the level relationship of the NTSC system.

The variable resistor 37 and the mixing circuit 40 carry out the following operation and calculation.

$$Y_O = G_1 + 0.3\, C_{R-G} + 0.11\, C_{B-G} \tag{14}$$

Accordingly, on the 2n'th line the following operation is conducted.

$$Y_O = G_{2n-1} + 0.3 \left( \frac{R_{2n} + R_{2n-2}}{2} - \frac{G_{2n} + G_{2n-2}}{2} \right)$$
$$+ 0.11\, (B_{2n-1} - G_{2n-1})$$

Since $$\frac{(G_{2n} + G_{2n-2})}{2}$$

corresponds to the green signal $G_{2n-1}$ on the (2n−1)'th line, the above expression can be rewritten as follows:

$$Y_O = 0.59\, G_{2n-1} + 0.3 \times \frac{R_{2n} + r_{2n-2}}{2} + 0.11\, B_{2n-1}$$
$$+ 0.3\, (G_{2n-1} - \frac{G_{2n} + G_{2n-2}}{2}) \tag{15}$$

On the (2n+1)'th line the following expression (16) is obtained.

$$Y_O = 0.59\, G_{2n} + 0.30\, R_n + 0.11 \times \frac{B_{2n-1} + B_{2n+1}}{2}$$
$$- 0.11\, (G_{2n} - \frac{G_{2n+1} + G_{2n-1}}{2}) \tag{16}$$

In the expression (15), the signal $Y_O$ on the 2n'th line, the green and blue signals $G_{2n-1}$ and $B_{2n-1}$ on the (2n−1)'th line and the average signal $$(\frac{R_{2n} + R_{2n-2}}{2})$$

of the red signals $R_{2n}$ and $R_{2n-2}$ on the 2n'th and (2n−2)'th lines are utilized. If the luminance signal is synthesized only from the above color signals, the resolution will be deteriorated by the mean value interpolation. However, as is apparent from the expression (15), the signal $Y_O$ contains the green signals $G_{2n-2}$ through $G_{2n}$ in addition to the above color signals, so that the deterioration of resolution is avoided by the existence of the green signals and the aperture correction effect as will be described later.

The high frequency band luminance signal $Y_{WH}$ is extracted from the signal $Y_W$ which is produced by the luminance signal synthesizing circuit 10. In the example of FIG. 7, the low pass filter 41 is used again to provide the signal $Y_{WH}$ from the signal $Y_W$. That is, the low pass filter 41 and an operational amplifier 42 form a circuit to extract the signal $Y_{WH}$ from the signal $Y_W$. The low frequency signal $Y_{WL}$ in the signal $Y_W$ is extracted by the low pass filter 41. Thus, if the signal $Y_{WL}$ and the inverted signal $Y_W$ are fed to the amplifier 42, the high frequency band luminance signal $Y_{WH}$ is obtained from the amplifier 42. Finally, the luminance signal Y consisting of the low frequency band signal $Y_{OL}$, which is provided from the signal $Y_O$, and the high frequency signal $Y_{WH}$, which is extracted from the signal $Y_W$, is produced, and a composite color video signal is provided by the luminance signal Y and the difference signals $C_{R-G}$ and $C_{B-G}$.

In FIG. 7, reference numerals 45 and 46 designate an amplifier and an aperture correction circuit, respectively, 48 designates a delay circuit which makes the signals $Y_W$ and $Y_{OL} - Y_{WL}$ applied to the amplifier 42 time coincident.

It will be apparent that many modifications and variations could be effected by one skilled in the art without departing from the spirits or scope of the novel concepts of the present invention, so that the spirits or scope of the invention should be determined by the appended claims only.

I claim as my invention:

1. A color television camera system employing first and second solid state image sensors, comprising:
   (A) a first imaging device for generating a first color signal of an image of an object on every line;
   (B) a second imaging device for generating second and third color signals of the image of the object alternately line by line;
   (C) optical means for projecting the same image of said object on said respective imaging devices;
   (D) first comb-filter means receiving said first color signal from said first imaging device;
   (E) second comb-filter means receiving said second and third color signals from said second imaging device; and
   (F) a signal mixing circuit for synthesizing at least a part of a luminance signal receiving the outputs from said first comb-filter means and second comb-filter means.

2. A color television camera system as claimed in claim 1, wherein the image of an object projected on one of said first and second imaging devices is displaced in the horizontal direction by half the alignment pitch of picure elements relative to the image of the object projected on the other imaging device.

3. A color television camera system as claimed in claim 2, wherein said first comb-filter means includes at least one delay line circuit which delays signals by one horizontal scan interval, and said second comb-filter means includes at least one delay line circuit which delays signals by one horizontal scan interval.

4. A color television camera system as claimed in claim 2, wherein said horizontal displacement is accomplished with a delay line circuit is commonly used in said first and second comb-filter means and said first, second and third color signals are added together before being supplied to said comb-filter means.

5. A color television camera system as claimed in claim 3, wherein said first and second comb-filter means each include two delay line circuits, and adding means, and non-delayed, 1H delayed and 2H delayed signals are mixed in said adding means with proper ratios in said first and second comb-filter means.

6. A color television camera system as claimed in claim 2, further comprising filter means which derives the high frequency components of a luminance signal from said first and second comb-filter means.

7. A color television camera system as claimed in claim 6, wherein said filter means includes a low pass filter circuit and a subtractor circuit for cancelling the low frequency components of a luminance signal from said first and second comb-filter means.

8. A luminance circuit for a color television camera with a pair of image sensors comprising, a first imaging device for generating a first signal of an image of an object on every line, a second imaging device for generating a second and third color signals of an image of an object on alternate lines, said first and second imaging devices laterally offset from each other in the horizontal direction by one half the alignment pitch of picture elements, first and second delay means each having delay times of one horizontal scan interval, said first delay means receiving the output of said first imaging device, a first adder receiving the outputs of said first delay means and said first imaging device, said second delay means receiving the output of said second imaging device, a second adder receiving the outputs of said second imaging device and said second delay means and a third adder receiving the outputs of said first and second adders and producing a luminance signal.

9. A luminance circuit according to claim 8 including a band pass filter which receives the output of said third adder.

10. A luminance circuit for a color television camera with a pair of image sensors comprising a first imaging device for generating a first signal of an image of an object on every line, a second imaging device for generating second and third color signals of an image of an object on alternate lines, said first and second imaging devices laterally offset from each other in the horizontal direction by one half the alignment picture of picture elements, first, second and third and fourth delay means each having delay times of one horizontal scan interval, said first delay means receiving the output of said first imaging device, said second delay means receiving an output from said first delay means, a first adding means receiving inputs from said first imaging device, said first delay means and said second delay means, said third delay means receiving the output of said second imaging device, said fourth delay means receiving an output of said third delay means, a second adding means receiving inputs from said second imaging device, said third delay means and said fourth delay means, and a third adding means receiving inputs from said first and second adding means to produce a luminance signal.

11. A luminance circuit according to claim 10 wherein the impedance from said first delay means to said first adder is two times the impedances from said first imaging device and said second delay means to said first adder.

12. A luminance circuit for a color television camera with a pair of image sensors comprising, a first imaging device for generating a first signal of an image of an object on every line, a second imaging device for generating second and third color signals of an image of an object on alternate lines, said first and second imaging devices laterally offset from each other in the horizontal direction by one half the alignment pitch of picture elements, a first adder means receiving outputs from said first and second imaging devices, first and second delay means each having delays equal to one horizontal scan interval, said first delay means receiving an output from said first adder, said second delay means receiving an output from said first delay means, and a second adder receiving inputs from said first adder, said first delay means and said second delay means and producing a luminance signal.

13. A luminance circuit according to claim 12 wherein the impedance from said first delay means to said second adder is two times the impedances from said second adder and said second delay means to said second adder.

* * * * *